United States Patent [19]

Shirtum

[11] Patent Number: 5,006,369
[45] Date of Patent: Apr. 9, 1991

[54] REMOVING CONTAMINANTS FROM A GAS STREAM

[75] Inventor: Robert P. Shirtum, Freeport, Tex.

[73] Assignee: The Dow Chemical Company, Midland, Mich.

[21] Appl. No.: 229,080

[22] Filed: Aug. 5, 1988

[51] Int. Cl.$^5$ .............................................. B05D 7/00
[52] U.S. Cl. ..................................... 427/212; 134/17; 134/31; 134/33; 264/7; 264/8; 427/420; 427/425
[58] Field of Search ................. 134/17, 31, 33; 264/7, 264/8; 427/212, 420, 425

[56] References Cited

U.S. PATENT DOCUMENTS 3,711,254  1/1973  McGowan et al. ................. 23/313
3,991,225  11/1976  Blouin .................................. 427/3
3,998,180  12/1976  Hawkins et al. ..................... 118/5

Primary Examiner—Michael Lusignan
Attorney, Agent, or Firm—Joe R. Prieto; Stephen P. Krupp

[57] ABSTRACT

A process for removing contaminants such as phenolic-containing dusts and mists from an inert gaseous process stream by contacting the gaseous stream with an aqueous alkali metal hydroxide solution whereby the contaminants react with the alkali metal hydroxide to produce alkali metal salts of the contaminant compounds and produce water soluble contaminant salts.

13 Claims, 2 Drawing Sheets

REMOVING CONTAMINANTS FROM A GAS STREAM

BACKGROUND OF THE INVENTION

The invention relates to an apparatus and a process for removing contaminants from a gaseous stream and more particularly to a scrubber apparatus and process for removing organic dust and mist from a closed loop gaseous stream.

Granulation processes described in U.S. Pat. Nos. 3,877,415; 3,991,225; 4,213,924; 4.424,176; 4,506,453 and 4,507,335 such as for the production of urea and sulphur products use a rotary drum granulator.

In a rotary drum granulation process as described in the above patents, a molten product is sprayed onto a falling curtain of small seed particles and undersize granules to increase the particle size by successive coating of molten material. During the process a tremendous amount of dust particulate and mist can be generated inside the drum. The dust and mist generated in the drum must be separated from any gaseous stream passed therethrough. Equipment external to the granulation drum, such as cyclone separators and bag houses, are commonly used for this purpose. However, these types of equipment for removing dust from the gas stream have not been adequate. It is important to remove the dust and contaminants from the gas stream to minimize the plugging of pipes and downstream equipment outside the drum. In addition, in an enclosed system or closed loop system, it is important to control the dust particles to avoid polluting the atmosphere with the dust or contaminants.

Current granulation cooling gas loop systems utilize a once through air as the coolant. This practice is not universally acceptable for all solid chemicals which might be granulated because environmental constraints or product exposure to the oxygen in air might be unacceptable. For example, because of the above restrictions, a recycle nitrogen as the coolant is used when applied to a bisphenol process.

It is known to use a nitrogen stream as a gas coolant to solidify, by freezing, for example, a molten liquid bisphenol fed to a granulator of a granulation process as described in copending U.S. patent application Ser. No. 005,504, entitled "Production of Granular Bisphenols," filed Jan. 20, 1987 by K. McDonald et al. Shutdowns of a granulation system frequently occur because of a build-up of dust and solids present in the gaseous stream on the surfaces of equipment.

It is, therefore, desired to provide a scrubber apparatus and process to remove dust and solids present in a gaseous stream of a granulation process which will advantageously allow a longer term of operation of a closed-loop nitrogen system without a build-up of dusts and tacky solids which eventually close off duct works of the system.

It is desired to provide an apparatus and process for reducing the amount of dust particles in a gas stream which exits from a rotary granulation drum.

It is further desired to provide a scrubber apparatus and process in which substantially all dusts, mists and solids present in a gaseous stream are dissolved in a scrubber liquid with sufficient levels of caustic present in the scrubber.

In addition, it is desired to provide a scrubber apparatus and process which advantageously removes phenolic containing dusts and mists with depositing characteristics from an inert gaseous process stream.

SUMMARY OF THE INVENTION

The present invention is directed to a process for removing contaminants such as phenolic-containing dusts and mists from an inert gaseous process stream by passing the gaseous stream through liquid spray streams of an aqueous alkali metal hydroxide solution whereby the contaminants react with the alkali metal hydroxide to produce alkali metal salts of the contaminant compounds and produce water soluble contaminant salts.

DETAILED DESCRIPTION OF THE PREFERRED EMBODIMENT(S)

The scrubber apparatus and process of the present invention is useful in any environment in which high levels of contaminants are generated. "Contaminants" herein means undesirable components in the form of a gas, liquid or solid and includes dust particles, mists, vaporized components, thermal degradation products and by-products. Most beneficial uses include enclosed environments wherein a gaseous stream is used and recycled, and the gaseous stream is in contact with the contaminants. For example, the apparatus and process is particularly useful in conjunction with a rotary drum granulator for producing granule products. The apparatus and process are useful for removing the contaminants which may contaminate the atmosphere if the gaseous stream is vented into the atmosphere. Also, the apparatus and process can be used to remove contaminants that may contaminate process equipment downstream from the gaseous stream.

The scrubber apparatus and process of the present invention is particularly useful in a melt granulation process for producing a bisphenol product. It is to be understood, however, that the scrubber apparatus and process can be used in any other melt solidification system wherein contaminant removal is required. For example, the present scrubber and process can be used in combination with prilling equipment and processes and flaking equipment and processes.

"Granulation" herein means the gradual increase of undersized nuclei to product size by successive layering or coating of the nuclei with the same or dissimilar molten compounds.

Bisphenol product granules produced by a melt granulation process includes growing granules of the required size by spraying molten bisphenol directly onto a seed material of bisphenol. Bisphenol normally is a solid or semisolid at ambient temperatures but can be reduced to a sprayable liquid state by melting and can be returned to the solid or semisolid state by cooling below the melt temperature. Generally, the granules of bisphenols have a high crush strength because each bisphenol granule develops from a single seed and successive layering of the seed. Each new layer is melted into the outer layer of the bead it coats thus producing a nonporous bead that has a glazed outer layer which resists dusting.

Figure 1:
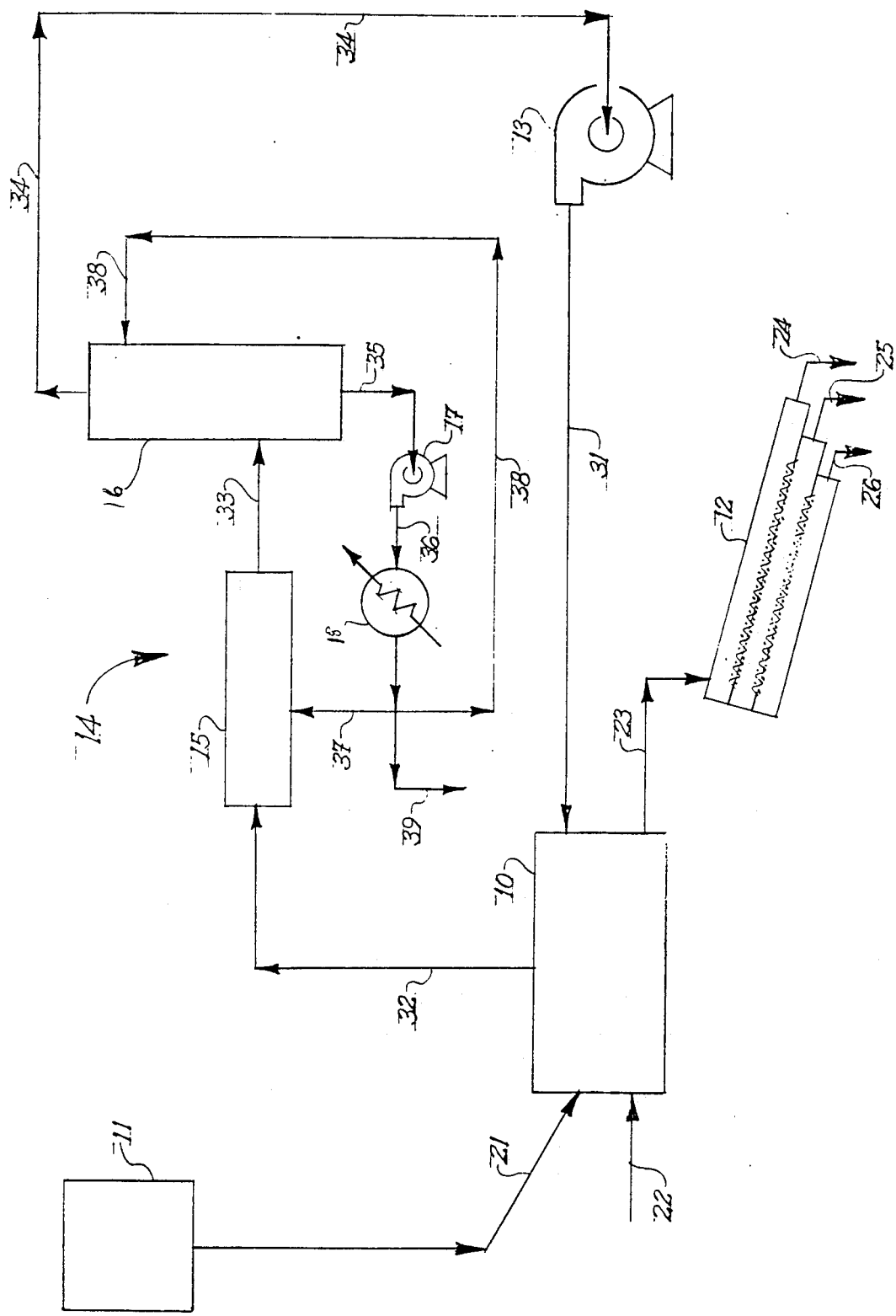
FIG. 1 is a schematic diagram of a granulation process with a scrubber system of the present invention.

With reference to FIG. 1, there is shown a granulation process including a scrubber apparatus and process of the present invention generally indicated by reference numeral 14. In FIG. 1, there is shown one embodiment of the apparatus and process of the present invention for melt granulation of bisphenols fed into a rotary granulation drum 10. Seed particles of bisphenols produced by any conventional seed generating system 11 are fed into the drum granulator 10 through feed stream 21. Molten bisphenol is sprayed onto the seed material inside the drum 10 through feed stream 22. Granulation occurs in the rotary drum 10 which is preferably enclosed in a gas-tight enclosure for operating the drum in a gaseous inert atmosphere. The enclosure can be advantageously maintained at a slight vacuum to avoid dust blowing out of the enclosure and into the atmosphere and polluting the environment.

A stream 23 of granules, formed inside the drum 10, discharge from the drum 10 and preferably pass into a double-deck screen 12 for separating product granules from oversize and undersize granules. The onsize or product granules of bisphenols (shown as stream 25 in FIG. 1), for example, may be routed from the screen 12 to bulk storage, to a fluid bed cooler for further cooling, or to a desired use point. The oversize granules (shown as stream 24 in FIG. 1) from the screen 12 may be remelted in a melter (not shown) and recycled or fed into the rotary drum granulator 10 by combining with the molten bisphenol feed stream 22, or conveyed to a desired use point. Optionally, the oversize granules may be ground for use as seed material in stream 21. The undersize (shown as stream 26 in FIG. 1) from the screen 12 may be conveyed to a recycle hopper (not shown), where the granules may be fed back into the granulation drum 10 with seed material in stream 21 at a metered rate by a weigh feeder. Optionally, the undersize granules may be fed into a melter to form a melt which may be recycled with molten feed stream 22 or conveyed to another desired use point.

During the granulation process, as the bisphenol seed material is sprayed with molten bisphenol and as the prayed bisphenols solidifies on the seed material or undersize granules, considerable heat is released inside the granulation drum 10. Cooling is provided by contacting the hot granules with a cooled gaseous stream. Preferably, the gaseous stream is an inert gas or a gas which is nonreactive with the product granules. The inert gaseous stream can be, for example, nitrogen, helium or other stable gases. Nitrogen is used in a process for granulating bisphenol because it does not impart a dull color to the bisphenol product granules and the gas reduces the chances of creating an explosive atmosphere in the granulation drum and other apparatuses. Efficient utilization of the cooling gas makes it practical to enclose the system and recirculate the inert gas.

Figure 2:
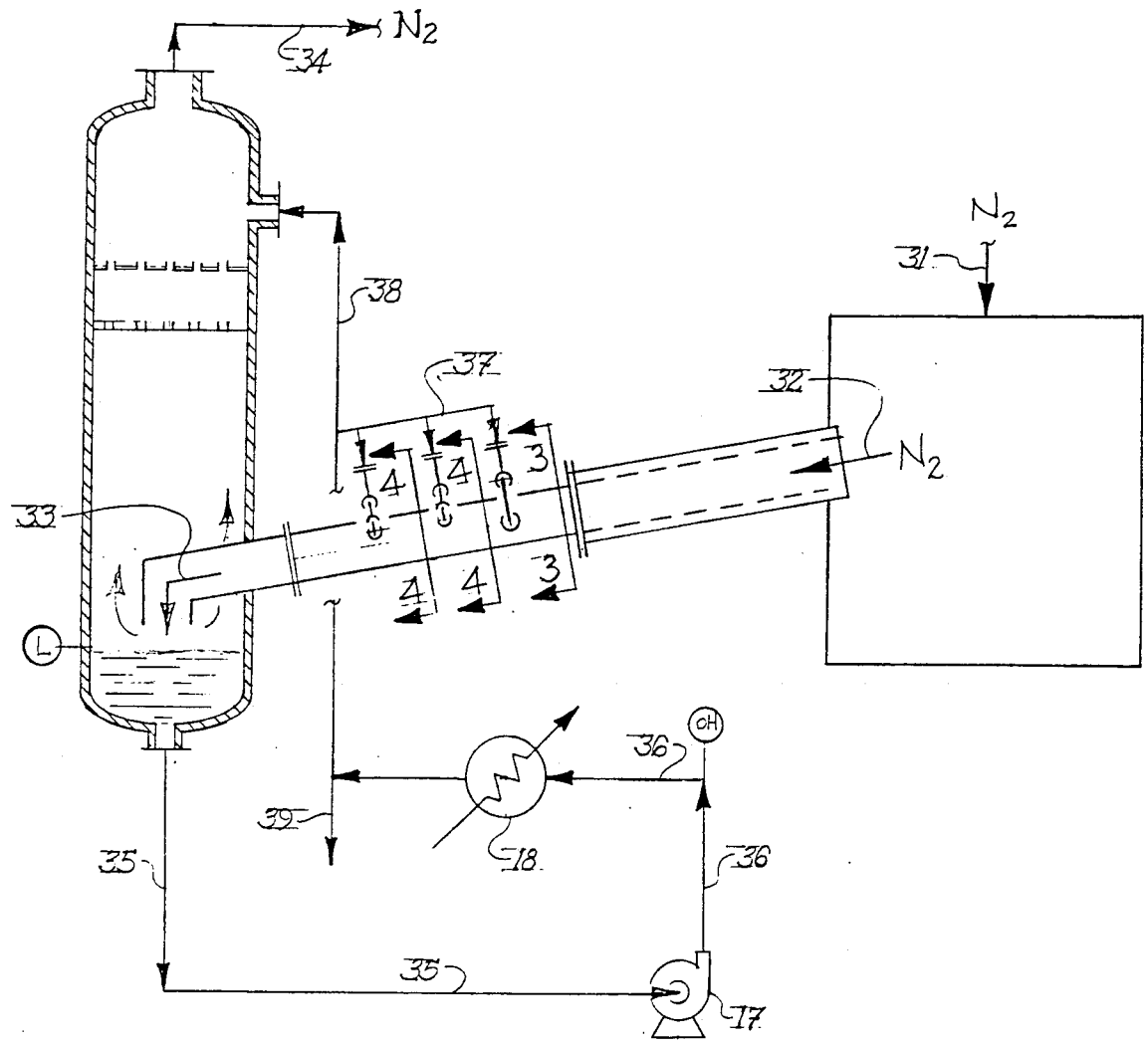
FIG. 2 is a partly schematic diagram, partly in section view showing a scrubber system of the present invention.
Figures 3, 4:
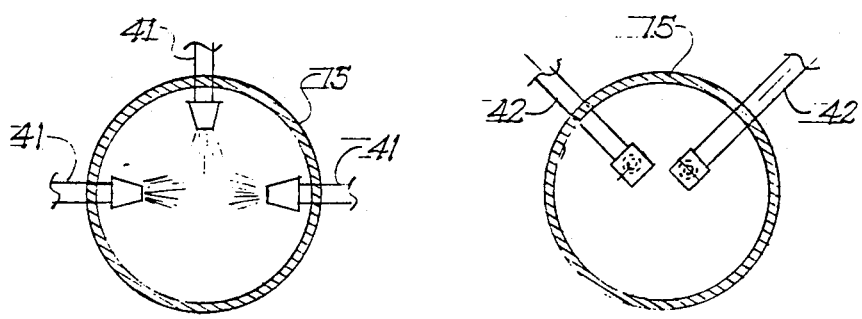
FIG. 3 is a cross-sectional view showing the nozzle arrangement of a scrubber of the present invention taken along line 3—3 of FIG. 2.
FIG. 4 is a cross-sectional view showing the nozzle arrangement of a scrubber of the present invention taken along lines 4—4 of FIG. 2.

The inert gaseous stream, in this instance nitrogen gas, is passed from a blower 13 through stream 31 to a gas distributor (not shown) inside the granulator drum 10. The gas exits the drum 10 through stream 32 t the scrubber system 14 of the present invention. The scrubber system 14 of the present invention is shown more clearly in FIG. 2. Contaminants produced in the granulation drum which exits the drum with the gaseous stream 32 can be separated from the gas and removed by the scrubber system 14 of the present invention. Generally, bisphenol dust levels generated in the drum have been measured in the range from about 10 mg/m$^3$ to about 50 mg/m$^3$.

With reference to FIGS. 1-4, contaminants generated in the granulator 10 are removed from the nitrogen gas leaving the granulator 10 in stream 32 by passing the nitrogen to a scrubber conduit 15 having jet nozzles 41 and 42 (shown in FIGS. 3 and 4) wherein an aqueous alkali metal hydroxide solution is sprayed into the passing nitrogen gas. The alkali metal hydroxide solution may be selected, for example, from a group consisting of sodium hydroxide, potassium hydroxide, lithium hydroxide and the like. Preferably, an aqueous sodium hydroxide solution (caustic) is used because it is readily available. The caustic and nitrogen gas is then passed, through stream 33, to a separator tower 16 to disengage or separate "clean" gas from the caustic. The effluent caustic containing salts of the contaminants in stream 35 from the tower 16 is recycled through stream 37 to the scrubber conduit 15 with pump 17 and passes to the nozzles 41 and 42 of conduit 15 for further spraying the nitrogen gas.

Preferably, the cleaned nitrogen stream 34 from the separator tower 16 is contacted with caustic solution to further remove contaminants from the gas which were not removed with spray stream of nozzles 41 and 42, by recycling the solution in stream 35 to near the top of the tower 16 in stream 38. A cooling means 18 is used for cooling the solution before passing the solution to the tower 16 so that the solution may simultaneously cool the gas stream as the solution removes contaminants therefrom. The cooling means 18 may be, for example, a conventional shell and tube-type heat exchanger using cooling tower water as the cooling medium in the shell side and recirculated solution in the tube side. The recirculated solution in stream 36 passe through the heat exchanger 18 and then to separator tower 16 in stream 38. Preferably the nitrogen stream is cooled down to a temperature of from about 20° C. to about 60° C. and more preferably from about 25° C. to about 40° C. The cleaned nitrogen in stream 34 can be recycled back to the granulator 10 after passing through the blower 13 and through stream 31. Bisphenol dust collected in the scrubber system 14 in purge stream 39 may be remelted and the melt may be recycled to the molten bisphenol feed stream 22 or the melt may be sent to a desired use point.

The nitrogen flow rate of the present process may vary depending upon the desired capacity. For example, a unit with a desired capacity of 5000 pounds per hour requires a flow rate of from about 3000 SCFM to about 8000 SCFM. The flow rate of nitrogen is small when compared to a prill system which is typically from 20,000 SCFM to 25,000 SCFM for a system with an equivalent capacity. The totally enclosed system of the present invention substantially minimizes yield loss, substantially reduces color of the product and substantially removes the potential for dust explosion.

The equipment used to carry out the granulation process may be conventional equipment used in granulation processes known to those skilled in the art. For example, the rotary drum 10 used in the present invention may be of the type described in U.S. Pat. Nos. 3,877,415; 3,991,225; 4,213,924; 4,424,176; 4,506,453 and 4,507,335. Generally, the rotary drum contains internal equipment including lifting vanes or flights, collecting or deflector pans, spray header and nozzle assembly, gas distributors and gas collection header pipes.

In the rotary drum 10, the longitudinal lifting vanes, or flights, are usually equally spaced on the drum's inside shell and designed to form continuous longitudinal curtains of falling solid particles. The shower of falling solid particles formed by the movement of the lifting flights fall on the deflector pan or pans for providing a curtain of falling granules on which the molten material can be sprayed with the spray header and nozzle assembly.

The seed particles used to form a bed of material in the drum 10 can be produced using conventional crushing or milling equipment. Mixing of the undersize granules with the seed particles, as aforementioned, can be carried out in a conventional feed hopper with a metering means for controlling the feed such as a weigh feeder.

The operation of the granulation drum is preferably carried out as described in U.S. patent application Ser. No. 005.504, incorporated herein by reference. Generally, as the rotary drum 10 is rotated, the seed particles and recycle undersize granules are elevated from the bed by the lifting flights and dropped onto the two inclined collecting pans installed in a step fashion. The rotational speed of the drum is preferably from about 5 rpm (revolutions per minute) to about 18 rpm. Granules flowing from the pans form a curtain of flowing granules into the lifting flights. Molten bisphenol is preferably sprayed on the curtain of the falling granules.

The preferred operating temperature of the undersized beads in the granulator is from about 70° C. to about 138° C. and more preferably, from about 123° C. to about 130° C. At temperatures lower than 70° C., an undesirable quantity of small beads, i.e., beads ranging from 200 to 400 micron size are produced. As the temperature of the beads increases, the production of small beads decreases and some of the seed particles agglomerate. The surface of these beads may be dull. At above 138° C. a tacky dust is formed and within a few minutes, the dust forms undesirable large balls ranging from 1-1½ inch in diameter.

The bisphenol hot melt feed rate of the process is dependent on the desired capacity, for example, a capacity of 5000 pounds per hour of melt feed can be used. The hot melt temperature is preferably from about 156° C. to about 180° C. and more preferably from about 158° C. to about 165° C. The hot melt temperature is maintained at from about 2° C. to about 10° C. above melting of the bisphenol.

Spraying of molten bisphenols onto the falling granules is carried out using a plurality of spray nozzles and tube members supported in a header assembly. Any spray header system with a plurality of spray nozzles can be used in the present process to spray molten bisphenols onto the seed material fed into the drum granulator 10. For example, a pipe or tube with nozzles attached along its length can be used for feeding liquid bisphenols to the drum and onto the seed material.

Preferably, a steam jacketed spray header and nozzle assembly is used to maintain the temperature of the melt. The spray pressure used is from about 50 psig to about 200 psig. The spray pattern is linear with each nozzle rotated slightly off the horizontal to avoid overlapping spray streams. Preferably, the spray nozzles each have inlet screens for minimizing nozzle plugging.

The droplets of molten bisphenols should be atomized finely enough that the formation of agglomerates in the granulation drum is minimized. The formation of finely atomized spray is preferably carried out by use of pressure-atomizing nozzles, i.e., nozzles in which the liquid is propelled by its own pressure through a small orifice at such high velocity that the stream is broken down into small droplets. The finely atomized bisphenols melt forms a thin layer on the falling granules, melts into the solid surface and quickly solidifies on the relatively cool surface. Product granules of the desired size are formed by successive layering of the melt on the granules as they pass through the drum 10.

The granules of bisphenol produced by the method of the above described process have excellent physical characteristics for providing beads which are capable of being handled more readily and easily without creating dangerous dust levels. The beads are substantially rounded but not necessarily perfect spheres. Any particle size above about 1 millimeter (mm) can be produced by granulation. Normally, the particle size of the onsize granules is from about 1.5 mm to about 2.5 mm in diameter.

The crush strength of the beads is measured by the force per unit area. Crush strength of beads is determined by the size and the quality of the beads. The quality is determined by several factors among which are the strength of the material, shape, and voids in the beads. Beads of uniform quality would be expected to break when the stress, force per unit area, reaches a yield value. In this situation the crush strength would be expected to be proportional to the square of the bead diameter of bead mass raised to the ⅔ power. The crush strength of the bisphenols granules is generally from about 300 to about 500 grams per square millimeter. Generally, the crush strength numbers are obtained by first measuring the diameter of a bead and then placing the bead on an analytical balance such as a Metler balance. A force is then applied on the bead until the bead yields. The following equation can be used to obtain the crush strength:

$$\text{Crush Strength} = \frac{\text{Force}}{(D^2)^{\frac{2}{3}}}$$

The friability of the beads is measured by the percent (%) breakage of beads rotating in a drum containing ⅜ inch steel balls. The friability of the bisphenols granules is generally from about 6 percent to about 10 percent. When the granules are allowed to cool slowly, the granules have better friability than those that are rapidly cooled in a fluid bed. The friability test shows that the former has about a 3% breakage whereas the latter has about a 9% breakage. Thus, it is only necessary to rapidly cool the product that is to be placed into sacks immediately.

The bulk density of the bisphenols product is generally from about 39 pounds per cubic foot (lb/ft³) to about 41 lb/ft³. The moisture content of the bisphenols is generally from about 1000 ppm to about 300 ppm.

In carrying out one embodiment of the process of the present invention, hot nitrogen gas containing organic contaminants such as phenolic components in stream 32, exits from a rotating drum 10 used in the production of bisphenol. The nitrogen is preferably at a temperature of from about 80° C. to about 150° C. and preferably at from about 90° C. to about 120° C. The hot nitrogen gas is passed through an atomized spray stream or a plurality of atomized spray streams of caustic in conduit 15. The caustic is sprayed with spray nozzles or spray cones 41 and 42 shown in FIGS. 3 and 4. The nozzles 41 and 43 used are flat pattern type spray nozzles commercially available from Spraying Systems Co. of Wheaton, Ill.

The phenolic compounds are reacted with the caustic to produce alkali metal salts of the organic compounds, to produce water soluble organic salts. From the conduit 15, the gas, water, organic salts and caustic stream is passed to a scrubber tower 16 of a conventional tower design. The scrubber tower 16 may contain sieve trays, packing material or other means for increased gas/liquid contact known by those skilled in the art. The water and organic salts are discharged out the bottom of the tower 16. A clean nitrogen gas is vented through the top of the tower 16 for recycling and further use.

The liquid residuals, i.e., the aqueous streams containing the alkali metal salts of the organic compounds (also referred to as scrubber solution herein), in the bottom of the tower 16 are temperature and pH controlled to achieve maximum solubility of the numerous organic salts formed in the tower spray conduit 15.

The organic contaminants present in the nitrogen gas may be, for example, phenols, bisphenols, cresols, and the like and the thermal degradation products thereof such as isopropenylphenol and phenol in the case of bisphenol A. The organic salt solution formed in the preferred operating ranges is a clear solution containing no insoluble components or sediments, which generally contains from about 2 to about 25 and preferably from about 8 to about 10 percent by weight of soluble organic salts, which are more easily handled than a slurry solution. The products formed in the above reaction include, for example, sodium phenate, mono sodium bisphenate, di-sodium bisphenate, mono sodium cresol, sodium salts of cresols, sodium salts of novolacs, potassium salts of the above, lithium salts of the above and the like.

In the case of bisphenol A, the scrubber solution organic salt composition is predominately phenol and 4-methyl-4-p-hydroxy-phenyl-2-pentanone, and much lesser amounts of isopropenylphenol and bisphenol A isomers. These compounds are recycled to the process or collected for disposal.

The removal of the organic compounds present in the gas is essential for trouble free operation of the granulator system to prevent plugging of the recycle nitrogen piping system in the granulation plant by the compounds.

The pressure of the present process may range up to about 100 psig and preferably is operated at atmospheric pressure or under slight vacuum.

The parameters which affect the solubility of the organic salts in the aqueous solution include, for example, molar equivalents caustic, temperature, pH, and density.

The temperature of the scrubbing process may range from about 20° C. to about 60° C. and preferably from about 25° C. to about 40° C. Temperatures too low cause the solution to freeze, while temperatures too high cause the aqueous solution to boil, thus changing the pH, and density of the solution.

The pH of the scrubber solution system may be from about 10 to about 14 and preferably from about 11.5 to about 12.5. A pH too low means the caustic concentration is too low to react with all the phenolic groups which will cause precipitation of insoluble organic compounds in the aqueous solution, and a pH too high causes precipitation of the caustic and/or organic salts out of solution.

The scrubber solution density may be from about 1.0 to about 1.25 grams per cubic centimeter (gms/cc) and preferably from about 1.02 to about 1.06 gms/cc. The solution density is proportional to the pH and exhibits the same effects on the solution as high and low pH.

As a broader scope of the present invention, the ratio of equivalent caustic to equivalent phenol hydroxyl ranges from about 0.8:1 to about 2.0:1 equivalents caustic/equivalents of phenolic-hydroxyl. The preferred ratio of equivalent caustic to equivalents of phenolic hydroxyl is from about 0.95:1 to about 1.05:1, where the phenolic hydroxyl unit is the ring structure, the hydroxyl group, and subsequent appended groups in the ortho and para positions on the phenyl ring.

Caustic equivalent ratios of less than 0.8 and greater than 2.0 cause precipitation of the organic salts out of the aqueous solution. At caustic equivalent ratios of 0.8 and less, there is not enough caustic to react with all the phenolic hydroxyl units, while ratios greater than 2.0 cause precipitation due to solubility limits for the organic salts, and preferential solubility of inorganic caustic over the organic salts in aqueous solutions.

Advantageously, the present process purifies a hot nitrogen vent gas from the granulator nitrogen recycle stream and prevents downstream plugging of large scale process equipment. The present invention eliminates process downtime to clean and repair equipment and prevents equipment corrosion due to the acidic nature of the phenolics in the vent gases.

What is claimed is:

1. A process for producing granulated material comprising:
   (a) feeding a seed material to a rotary granulation drum;
   (b) spraying molten material onto the seed material falling in a curtain-like pattern inside the drum to form granules;
   (c) substantially simultaneously with steps (a) and (b) feeding an inert gaseous stream into the drum to cool the granules; and
   (d) contacting the gaseous stream with an aqueous alkali metal hydroxide solution to reduce the amount of organic dust and mist contaminants present in the gaseous stream.

2. The process of claim 1 including the step of separating the gaseous stream from the solution stream subsequent to the step of contacting said gaseous stream with said aqueous alkali metal hydroxide solution.

3. The process of claim 1 wherein the gaseous stream is nitrogen.

4. The process of claim 1 wherein the alkali metal hydroxide is selected from the group consisting of sodium hydroxide, potassium hydroxide and lithium hydroxide.

5. The process of claim 4 wherein the alkali metal hydroxide is sodium hydroxide.

6. The process of claim 1 wherein the contacting step includes spraying the gaseous stream with at least one atomized liquid spray stream of an alkali metal hydroxide.

7. The process of claim 1 wherein the process is conducted at a pressure of from about 14 psia to about 16 psia.

8. The process of claim 1 wherein the process is conducted at a temperature of from about 20° C. to about 60° C.

9. The process of claim 1 wherein the process is conducted at a pH of the solution of from about 11.5 to about 12.5.

10. The process of claim 1 wherein the process is conducted at a solution density of from about 1.0 to about 1.25 grams per cubic centimeter.

11. The process of claim 1 wherein the contaminants are phenolic-containing dusts and mists.

12. The process of claim 11 wherein the process is conducted at a pressure of from about 14 psia to about 16 psia, a temperature of from abut 20° C. to about 60° C., a solution pH of from about 11.5 to about 12.5, and a solution density of from about 1.0 to about 1.25 grams per cubic centimeter.

13. The process of claim 1 wherein said inert gaseous stream is recirculated in a closed loop gas cooling process.

* * * * *